United States Patent Office 3,707,347
Patented Dec. 26, 1972

3,707,347
STAINING PLASTIC SURFACES
Bruce M. Mueller, Ottawa Lake, Mich., assignor to
Owens-Illinois, Inc.
No Drawing. Continuation of abandoned application Ser.
No. 744,346, Sept. 12, 1968. This application Aug. 17,
1971, Ser. No. 172,601
Int. Cl. D06p 3/00
U.S. Cl. 8—4
10 Claims

ABSTRACT OF THE DISCLOSURE

Plastic articles are provided with sub-surface markings which are scuff-proof and resistant to acid, alkali and solvent attack. Dye-bearing compositions are applied to a plastic surface in a desired pattern; surface and dye-bearing composition are then suitably processed to effectuate a diffusion of the dye into the surface and the residual composition is removed from the surface, thereby resulting in a durable and resistant sub-surface pattern.

THE INVENTION

This application is a continuation of application Ser. No. 744,346, filed Sept. 12, 1968, now abandoned.

This invention relates to the permanent marking, printing or decorating of polymeric surfaces. More particularly it relates to the formation of sub-surface markings on polymeric articles, such as beakers and container items, which are scuff-proof and highly resistant to chemical attack, e.g. by caustic, hydrochloric acid and sulfuric acid.

Untreated polyolefins and other polymers produced from monomers having monoethylenically unsaturated bonding, will not permit conventional ink coatings to adhere thereto. Standard type inks, e.g. gravure, silk screen, flexographic and dry offset inks, when applied to these type surfaces and dried or cured in accordance with the normal schedule for any particular ink or coating, are easily removed therefrom by a slight scraping action. Another drawback of these compositions, which is especially acute in the marking of palstic laboratory ware such as, for example, beakers, flasks and pipets, is that they are subject to attack by solutions of acid, alkali, or solvents.

In recent years much has been done in this field to develop techniques for improving the adherence of inks, markings and coatings to polymeric materials. These efforts have been primarily restricted to various surface treatment procedures such as applying an oxidizing solution of sodium dichromate and sulfuric acid to the polymer surface or flame treating the surface prior to ink application. While somewhat successful, these techniques still result in markings or prints which can be chemically removed or physically removed by scraping because the final marking is typically raised, or projects upwardly of the polymer surface, thereby making it highly susceptible to abrasion and/or chemical attack. Additionally, these treatments tend to change the properties of the polymeric materials and make them more reactive with alkalies and acids. Those skilled in the art readily appreciate that the necessity of a pretreatment substantially increases the cost of manufacturing marked polymeric materials.

Still more recently, techniques have been developed for penetrating the polymeric surface during marking. U.S. Pat. Nos. 3,057,098 and 3,290,166 respectively, disclose these techniques. In the former patent the polymeric surface is penetrated by a puncturing or scoring step, the marking composition then being applied to the resulting recesses. It will be appreciated, especially in the case where arcuate surfaces are involved, that this approach is impractical in the manufacture of container items because of the precision and care which is required to guard against forming a puncture which is coextensive with the wall thickness of the container. The latter patent relates to colored low molecular weight polyolefin marking compositions. Here the composition is applied to the substrate and, after a heating step, the composition partially penetrates the substrate surface. This technique results in a marking which can be scraped off with a knife blade.

This invention distinguishes over the prior art in that it is directed to plastic surface marking which is disposed entirely beneath the surface and which cannot be removed by abrasion or scraping without destroying the surface to which it is appendant. Moreover, because of the sub-surface nature of the marking, it is highly resistant to attack by caustic, sulfuric acid, hydrochloric acid and other solvents. The durable and resistant sub-surface mark, print, or decoration which is provided by this invention is obtainable without the use of any pre-treatment steps.

In order to obtain the improved, marked plastic surfaces as contemplated herein, a dye or organic colorant is applied in any desired pattern onto a plastic substrate; the substrate is then heated for a sufficient time to allow a substantial portion of the colorant to diffuse and penetrate beneath the surface. The residual colorant, i.e. that portion which has not diffused, is then removed from the substrate surface. The organic colorant may be applied electrostatically or by letterpress, gravure, silk-screen, offset or other like conventional printing technique. Additionally, while the invention may be practiced by the exclusive use of an organic colorant, the invention is advantageously practiced by applying the colorant as a solution or dispersion in a suitable carrier or vehicle. The carrier need not be of the type which penetrates the plastic substrate. In the preferred practice of this invention, the marking composition includes an organic colorant, a carrier and suitable adjuvants. The adjuvants employed, such an anti-foaming agents and thickening agents, will be readily selected by those skilled in the art. They are used to adjust the consistency of the marking composition to that required for the specific printing or marking technique being employed and are not critical in relation to the practice of this invention.

In its broadest aspect, the invention comprises using an organic colorant which in itself penetrates the surface and diffuses into the molecular structure of a decorable plastic material. The resulting decoration is thus disposed within the material, beneath the surface thereof, and is consequently neither susceptible to abrasive removal nor to attack by acids, alkalies or solvents.

Plastic materials which may be decorated and marked in accordance with the teachings of this invention include the polycarbonates, polyolefins, and those plastics manufactured from monoethylenically unsaturated monomers such as, for example, vinyl polymers and polystyrene. Thus, suitable compositions in general include polymers and copolymers of the following monomers: ethylene, propylene, butene-1, pentene-1, hexene-1, 3 methyl butene-1, 4 methyl pentene-1, 5 methyl hexene-1, styrene, vinyl chloride and vinyl acetate.

The organic colorants suitable for the practice of this invention are those compounds known in the printing and decorating arts as dyes. It will, of course, be readily apparent that the specific dye employed will depend upon the requirements of the article manufacture. For a comprehensive list of available dyes reference may be made to The Chemistry of Synthetic Dyes and Pigments, by H. A. Lubs, Reinhold Publishing Corporation, 1955. Representative classes of dyes include acid, basic, spirit oil, vat and disperse dyes. Table I represents a partial summary of commercially available diffusable dyes suitable for the practice of this invention.

TABLE I

| | | |
|---|---|---|
| Interchemical Corporation | Yellow G. Base | Disperse Yellow 3 _____ C.I. 1803. |
| Color and Chemical Div | Blue N.S.P. Base | Disperse Blue 1 _____ C.I. 1709. |
| | Red R.N. Base | Disperse Red 17 _____ C.I. 1305. |
| General Aniline & Film Corporation | Sudan Red MR | |
| | Celliton Fast Blue AF | C.I. 61115. |
| | Resoform Red BN | C.I. 60710. |
| | Sudan Green 4B | C.I. 60710. |
| | Azosol Brilliant Yellow 8 GF _____ Solvent Yellow 43 | |
| E.I. du Pont de Nemours & Co., Inc | Rhodamine B Base | |
| Patent Chemicals Co | Fluid Blue 8 | |
| | Fluid Green 1 | |
| | Fluid Black 1 | |
| | Fluid Red G | |
| | Fluid Red 29 | |
| | Fluid Bronze 1 | |
| | Fluid Yellow 8 | |
| National Aniline Div. of Allied Chemical Co | Plasto Blue RDA | |

As priorly noted, this invention is advantageously practiced by applying the dye as a solution or dispersion in a suitable carrier. Furtherly, adjuvants may be added to the dye-bearing composition. These adjuvants will be readily selected by those skilled in the art depending upon the mode of application. Acceptable carriers may include those which are conventional in the printing industry such as, for example, epoxy resins, polyamide resins, lithographic varnishes, alkyd oils and vegetable oils. The adjuvants employed are also conventional materials and generally include thickening and antifoaming agents.

In the preferred practice of this invention, a dye bearing composition is applied to the plastic surface by means of conventional silk-screen printing techniques. It, of course, being understood that gravure, letterpress and offset printing are equally applicable. The preferred dye carrier is a conventional lithographic varnish. As is well known, these varnishes are made in number of consistencies, these consistencies being designated by numbers from ought to nine and from ought to five ought. While there is nothing critical in the selection of an appropriate consistency, for purposes of silk-screen decorating, lighographic varnish numbers in the range of one to five are generally acceptable, i.e. heavy lithographic varnishes. In lieu of the lithographic varnish, epoxy resins in a suitable solvent may likewise be employed as the dye carrier. These resins, which will be readily selected by those skilled in the art, generally include those manufactured by Shell Chemical Company under the trademark EPON. These resin are typically represented by the structural formula:

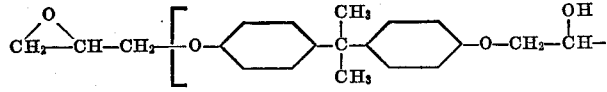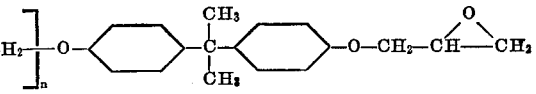

Table II describes specific EPON resins which may be advantageously employed as the carrier for a diffusable dye.

TABLE II.—EPON RESINS

| | EPON 1010 | EPON 1001 | EPON 1007 | EPON 820 |
|---|---|---|---|---|
| Melting point, °C | 155–165 | 65–75 | 125–135 | (¹) |
| Color, 25° C. (Gardner) ², max | 6 | 4 | 5 | 8 |
| Viscosity, 25° C. Gardner-Holdt poise ³ | Z5–Z7 / 100–390 | D–G / 1.0–1.7 | Y–Z / 18–28 | 40–100 |
| Epoxide equivalent ⁴ | 4,000–6,000 | 450–550 | 2,000–2,500 | 180–195 |

¹ Liquid-room temperature.
² Using ASTM D1544–58T.
³ Bubble-tube method, ASTM 154D, for EPON 1001 and 1007 and 1100; Kinematic viscosity, ASTM D445–53T, for EPON 820.
⁴ Grams of resin containing one gram-equivalent of epoxide; a-epoxy group content, ASTM D1652–59T.

Suitable solvents which may be used in the ink formulations include methyl ethyl ketone, methyl isobutyl ketone, diacetone alcohol, n-butyl acetate, ethylene glycol monoethyl ether, ethylene glycol monomethyl ether, ethylene glycol monobutyl ether, diethylene glycol monoethyl ether, diethylene monomethyl ether, diethylene glycol monobutyl ether, ethylene glycol monoethyl ether acetate, toluene, xylene, trichloropropropane, chloroform, isophorone, and mixtures of same such as mixtures of toluene-isopropyl alcohol, mixtures of toluene-sec butyl alcohol, mixtures of toluene with 4-methyl-2-pentanal and the like. In one preferred embodiment hereof, the solvent is nonaromatic and is an aliphatic solvent such as diethylene glycol monobutyl ether.

Adjuvants which are advantageously incorporated into the dye bearing composition for purposes of silk-screen application may include thickening agents, anti-foaming agents and a wetting agent, all of which are well known in the art. A suitable wetting agent which may be employed is a solution of polypropylene in xylene; one such commercially available material is supplied by the Hercules Powder Company as Hercoprime-15X.

Suitable antifoams include the silcones manufactured and supplied by the General Electric Company such as, for example, AF–3 which is a dimethylpolysiloxane. Other suitable antifoams include AF–5 and AF–7. Table III represents a summary of the properties of these materials.

TABLE III

| | AF–3 | AF–5 | AF–7 |
|---|---|---|---|
| Silicone solids (percent) | 100 | 100 | 100 |
| Wt. per gallon (lbs.) | 8.0 | 8.0 | 8.0 |
| Specific gravity at 25° C | 0.973 | 0.974 | 0.975 |
| Viscosity at 25° C. (centistokes) | 350 | 1000 | 12,500 |
| Flash point (Oper. cup ° F.), min | 600 | 600 | 600 |

Agents which may be employed to thicken and adjust the consistency of the dye-bearing composition include small particulate silica and/or bentonite compositions.

Suitable extremely fine particle size silica is commercially supplied by the Cabot Corporation under the name Cab-O-Sil. Various grades are available some of which are described in Table IV.

TABLE IV
Typical properties of three main grades of Cab-O-Sil

| | Cab-O-Sil | | |
|---|---|---|---|
| | M–5 | H–5 | EH–5 |
| Silica content,¹ percent | 99.8 | 99.8 | 99.9 |
| Moisture content, percent | 1.5 | 4.0 | 5.0 |
| Ignition loss,² percent | 1.0 | 2.0 | 2.5 |
| Metallic oxides, percent | 0.1 | 0.1 | 0.1 |
| pH | 4.0 | 3.9 | 3.8 |
| Surface area, m.² gram | 200 | 325 | 390 |
| Average particle size, micron | 0.012 | 0.007 | 0.007 |
| Particle shape | (³) | (³) | (³) |
| Number of particles (per gram) | 4.4×10¹⁷ | 2.1×10¹⁸ | 2.0×10¹⁹ |
| Specific gravity | 2.2 | 2.2 | 2.2 |
| Loose bulk density, lb. cu. ft | 2.3 | 2.3 | 2.3 |
| Refractive index | 1.46 | 1.46 | 1.46 |
| X-ray structure | (⁴) | (⁴) | (⁴) |

¹ Excludes physically adsorbed water.
² Includes chemically combined water.
³ Spherical.
⁴ Amorphous.

Bentonite compounds are well known products and are freely disclosed in US. Pat. No. 2,531,427, in Chemical Engineering, March 1952, pp. 226 to 230, in the Journal of Physical and Colloid Chemistry, vol. 53, February 1949, and vol. 54, November 1950. Examples of organophilic bentonites contemplated herein include the reaction products of octadecyl ammonium halide with a sodium type bentonite, dodecylammonium halide with a sodium type bentonite, and dimethyl dioctadecylammonium halide with a sodium type bentonite; they may be described as octadecylammonium bentonite, dodecylammonium bentonite and dimethyl dioctadecylammonium bentonite and dimethyl dioctadecylammonium bentonite. In addition, such bentonite compounds may be formed from the reaction of aminos and clays. Typical amines include hexadecylamine, hexadecenylamine, undecenylamine, dodecylamine and other long chain aliphatic amine reaction products. Of particular interest is the reaction product of long chain aliphatic amines and zeolitic clays, especially of the class montmorillonite. Montmorillonite is a hydrous silicate mineral having an expanded lattice. The above described products are commercially known under the trademark "Bentone," owned by the National Lead Company, with specific products being designated as Bentone 18, Bentone 27, Bentone 34 and Bentone 38.

Generally, plastic surfaces are decorated in accordance with this invention by first preparing a dye-bearing composition. This composition is then applied to a decorable plastic surface by any suitable means, for example silk-screen printing; the marked surface is then heated for a sufficient time to obtain the desired depth of dye diffusion into the plastic. The intensity and duration of the heating step will generally be dependent upon the article involved; however, it is typically sufficient to heat the decorated article to a temperature range of about 150–310° F. for about 2–35 minutes. After the heating cycle is completed the residual material remaining above the plastic surface is removed, thus leaving a marking on the article which is entirely disposed beneath the surface. In the preferred practice of this invention the residual super-surface material is removed by wiping the decorated area with a suitable solvent. Thus, for example, when the carrier consists of a resin dissolved in a solvent, this same solvent may be used to wipe off the residual material. When lithographic varnishes are employed, any of the solvents noted above such as, for example, ethylene glycol monobutyl ether may be advantageously employed. If desired, however, other removal means may be used such as immersing the decorated surface in a suitable solvent subsequent to the heating cycle or mechanically removing the residue by a doctor-blade technique.

In general, as priorly noted, a broad class of dyes may be employed in the practice of this invention. Representative classes which may be cited include monoazo, diazo, azoic, acridine, azine, ketone imine, methene, nitro, nitroso, oxazine, quinoline, xanthene and anthroquinone. Because of the numerous dyes which are available it would be highly impractical to set forth a comprehensive list. Furthermore, since the practice of this invention has wide utility, the desired decoration may have different requirements; that is, in one case only a faint or soft sub-surface marking may be desired whereas in a different application a highly intense decoration may be required. Since the mechanism of dye diffusion into the polymer is not fully understood, some experimentation will be required in order to determine the optimum method conditions for a specific application. This can be done by simply placing the dye on the plastic to be decorated, heating the plastic and dye and then removing any residual dye from the surface. Those skilled in the art will readily adjust the method to their specific requirements by visually observing the intensity of the resultant, sub-surface marking. The dye may be applied as a solid particulate material or it may first be dissolved or dispersed in a suitable material, such as benzene, and applied in this state.

This invention is especially useful in permanently marking plastic scientific ware such as graduated cylinders, beakers, pipettes and centrifuge tubes. In addition to these arcuate surfaces it will, of course, be apparent that the invention is likewise applicable to decorating and marking substantially planar plastic surfaces.

The various adjuvants of the dye-bearing composition are not critical, nor are their relative percentages. Furtherly, numerous dye classes may be employed in the practice of this invention. However, in order to aid those skilled in the art to duplicate this invention a list of acceptable diffusable dyes follows; it will, of course, be apparent that these dyes are merely exemplary and are not to be taken as limiting the scope of this invention. As examples of acceptable diffusable dyes may be cited Rhodamine B; Pyronine G; Saccharein, Rhodamine S; Rhodamine 5G; 1, 4 dialkylamineanthroquinone, wherein the alkyl group is a lower alkyl or hydrogen; halogenated anthroquinones such as 1,4,5,8 tetrachloroanthraquinone, 1,4- dialkylamine-2,3- dichloroanthraquinone, 3 amino-1,3-dibromoanthraquinone, 1 bromo - 4 - hydroxyanthraquinone and other substituted anthraquinone dyes.

The hereinafter examples represent some of the best modes contemplated by the inventor in the practice of this invention. The specific dyes employed in the examples were Rhodamine B, a well known commercially available dye, and a 1,4 dialkylamine anthraquinone such as that manufactured and supplied by the National Aniline Division of Allied Chemical Co. under the name Plasto Blue RDA.

EXAMPLE I

A dye-bearing composition was prepared using the following procedure. A heavy lithographic varnish was added to a suitable receptacle and to this varnish was added, with vigorous agitation, about 10 parts Plasto Blue RDA dye, 1 part antifoaming fluid AF-3 and about 8 parts of Bentone 27. After the mixture became homogeneous due to the agitation, the composition was applied in a selected pattern to a polypropylene beaker by means of a conventional silk-screen decorating technique. The decorated beaker was then heated to a temperature of 250° F. for 10 minutes to allow the dye to penetrate and diffuse into the polypropylene. This was done in a conventional hot air oven. The beaker was then taken from the oven and the residual dye-bearing composition removed from the surface of the beaker by wiping with ethylene glycol monobutylether. There then remained a sub-surface decoration which could not be removed by vigorous scraping with a knife blade.

The sub-surface decorated beaker was then subjected to acid and alkali treatment in accordance with Federal Specification NNN–F–240a for laboratory ware. According to this treatment beakers are immersed in sodium hydroxide, hydrochloric acid and sulfuric acid in order to test the solvent resistance of the decoration. A decorated beaker was completely immersed in 1 N sodium hydroxide solution at room temperature, covered, and boiled for one-half hour. The beaker was then allowed to remain in the alkali for an additional one hour. After removal from the solution no deterioration of the sub-surface marking was discernable. Another beaker was similarly immersed in concentrated hydrochloric acid (specific gravity 1.18); after remaining in the hydrochloric acid for one and one-half hours subsequent to boiling no marking deterioration was noted. Another beaker was allowed to remain completely immersed in concentrated sulfuric acid (specific gravity 1.84) at room temperature for one hour. Again no deterioration of the subsurface marking was discernable.

EXAMPLE 2

Another dye-bearing composition was prepared by first adding about 100 parts EPON–1010 to about 100 parts diethylene glycol monobutylether with vigorous agitation. To this resulting carrier was added 10 parts Plasto Blue RDA dye, 50 parts Hercoprime 15-X, 1 part AF-3 antifoaming agent and 20 parts Cab-O-Sil M-5. After a short mixing interval the composition was applied to a polyethylene surface using a silk screen technique and the dye was diffused into the surface by heating to about 230–240° F. for 2 to 4 minutes. The residual dye-bearing composition remaining upon the polyethylene surface was then removed by wiping with diethylene glycol monobutylether. The resultant sub-surface decoration could not be removed by vigorous scraping with a knife blade and was, likewise, highly resistant to solvents.

Table V summarily presents various dye-bearing compositions which may be utilized in the practice of this invention. They are suitable for decorating polycarbonate surfaces as well as other polymeric surfaces such as those polymers manufactured from monomers having olefinic unsaturation.

TABLE V

| | Compositions in parts by weight | | | | | |
|---|---|---|---|---|---|---|
| | 1 | 2 | 3 | 4 | 5 | 6 |
| Heavy lithographic varnish | 100 | | 100 | 100 | 100 | 100 |
| EPON-1010 | | 100 | | | | |
| Diethylene glycol monobutyl ether | | | 100 | | | |
| Plasto Blue RDA | 10 | 10 | | 10 | 10 | |
| Rhodamine B | | | 15 | | | 10 |
| Hercoprime 15-X | | 50 | 32 | 32 | | |
| AF-3 (antifoam) | 1 | 1 | 1 | 1 | | |
| Cab-O-Sil M-5 | | 20 | 20 | 20 | | |
| Bentone-27 | 8 | | | | 8 | 8 |

While several examples have been described in detail, it will be apparent that these examples are merely exemplary and not limiting. Consequently, the true scope of this invention is as described in the following claims.

What is claimed is:

1. A process for permanently marking a decorable shaped plastic article selected from polycarbonate or polymers of monoethylenically unsaturated monomers which comprises:
   (a) applying a plastic-surface penetrating dye in a liquid carrier selected from an epoxy resin solution, a liquid epoxy resin, or polyamide resin, and an effective consistency adjusting amount of a thickening agent to the surface of said plastic article,
   (b) diffusing said dye into said surface by heating and
   (c) removing residual dye and liquid carrier remaining on said surface.

2. The process of claim 1 wherein said dye is an anthraquinone dye.

3. The process of claim 1 wherein said dye is a xanthene dye.

4. The process of claim 1 wherein said dye is a disperse dye.

5. The process of claim 1 wherein said dye is benzene soluble.

6. The method of claim 1 wherein said thickening agent is a bentonite composition or particulate silica.

7. The method of claim 1 wherein said dye is present in said composition in about 10 parts by weight and said thickening agent in about 8 parts by weight.

8. The process of claim 1 wherein step (c) is effected by wiping said surface.

9. The process of claim 8 wherein step (a) is effected by silk-screening a selected pattern onto said surface and step (b) is effected by heating said surface at a temperature between about 150–350° F. for about 2–35 minutes.

10. A process for permanently marking a decorable shaped plastic article selected from polycarbonate or polymers of monoethylenically unsaturated monomers, which consists essentially of:
   (a) silk-screening a composition consisting essentially of a plastic-surface penetrating dye in a liquid carrier selected from an epoxy resin solution, a liquid epoxy resin or a polyamide resin, and an effective consistency adjusting amount of a bentonite composition to the surface of said plastic article,
   (b) diffusing said dye into said surface by heating and
   (c) removing residual dye and liquid carrier remaining on said surface.

References Cited

UNITED STATES PATENTS

| 3,502,495 | 3/1970 | Akamatsu | 117—38 |
| 3,009,760 | 11/1961 | Lenz | 8—4 |
| 2,260,543 | 10/1941 | Smith | 8—4 |
| 2,524,811 | 10/1950 | Koberlein | 8—4 |
| 3,057,098 | 10/1962 | Gabriel | 264—340 |
| 3,290,166 | 12/1966 | Sharp et al. | 117—138.8 E |
| 3,245,796 | 4/1966 | Burg | 96—67 |
| 3,467,481 | 9/1969 | Gold | 8—4 |
| 3,477,799 | 11/1969 | Garnett | 8—4 |

FOREIGN PATENTS

| 1,064,663 | 9/1959 | Germany | 8—4 |
| 1,076,698 | 7/1967 | Great Britain | 8—4 |
| 614,595 | 12/1960 | Italy | 8—4 |
| 485,582 | 10/1965 | Japan | 8—4 |

GEORGE F. LESMES, Primary Examiner

T. J. HERBERT, Jr., Assistant Examiner

U.S. Cl. X.R.

117—38